United States Patent [19]
Tuckey et al.

[11] Patent Number: 6,000,426
[45] Date of Patent: Dec. 14, 1999

[54] FUEL SYSTEM FOR REDUCING FUEL VAPOR

[75] Inventors: Charles H. Tuckey, Cass City; Billy R. Blackwell, Lake, both of Mich.; Lawrence E. Egle, Sarasota, Fla.

[73] Assignee: Walbro Corporation, Cass City, Mich.

[21] Appl. No.: 08/994,417

[22] Filed: Dec. 19, 1997

(Under 37 CFR 1.47)

[51] Int. Cl.⁶ .................................................. F02M 33/00
[52] U.S. Cl. ......................... 137/588; 137/592; 123/516; 123/519
[58] Field of Search ................................... 123/516, 519, 123/520; 137/587, 588, 592

[56] References Cited

U.S. PATENT DOCUMENTS

| | | | |
|---|---|---|---|
| 3,191,587 | 6/1965 | Hall | 123/519 |
| 3,610,220 | 10/1971 | Yamada et al. | 123/518 |
| 3,675,634 | 7/1972 | Tatsutomi et al. | 123/519 |
| 3,683,597 | 8/1972 | Beveridge et al. | 123/519 |
| 5,054,453 | 10/1991 | Onufer | 123/522 |
| 5,579,802 | 12/1996 | Tuckey | 137/202 |
| 5,606,954 | 3/1997 | Yamazaki et al. | 123/516 |
| 5,870,997 | 2/1999 | Mukai | 123/520 |

*Primary Examiner*—A. Michael Chambers
*Attorney, Agent, or Firm*—Reising, Ethington, Barnes, Kisselle, Learman & McCulloch, P.C.

[57] ABSTRACT

A system to collect and control the flow of fuel vapor within a vehicle fuel system. In one embodiment, a vapor control unit mounted in the fuel tank permits fuel vapor to be drawn into a tank fill pipe when liquid fuel is being added to the fuel tank to condense at least a portion of the fuel vapor. In a second embodiment a diaphragm actuated valve permits fuel vapor flow from the fuel tank into the tank fill pipe when liquid fuel is being added to the tank to condense at least a portion of the fuel vapor. By condensing the fuel vapor the system reduces the total amount of fuel vapor within the fuel system while preventing the escape of fuel vapor which is hazardous to the environment.

13 Claims, 3 Drawing Sheets

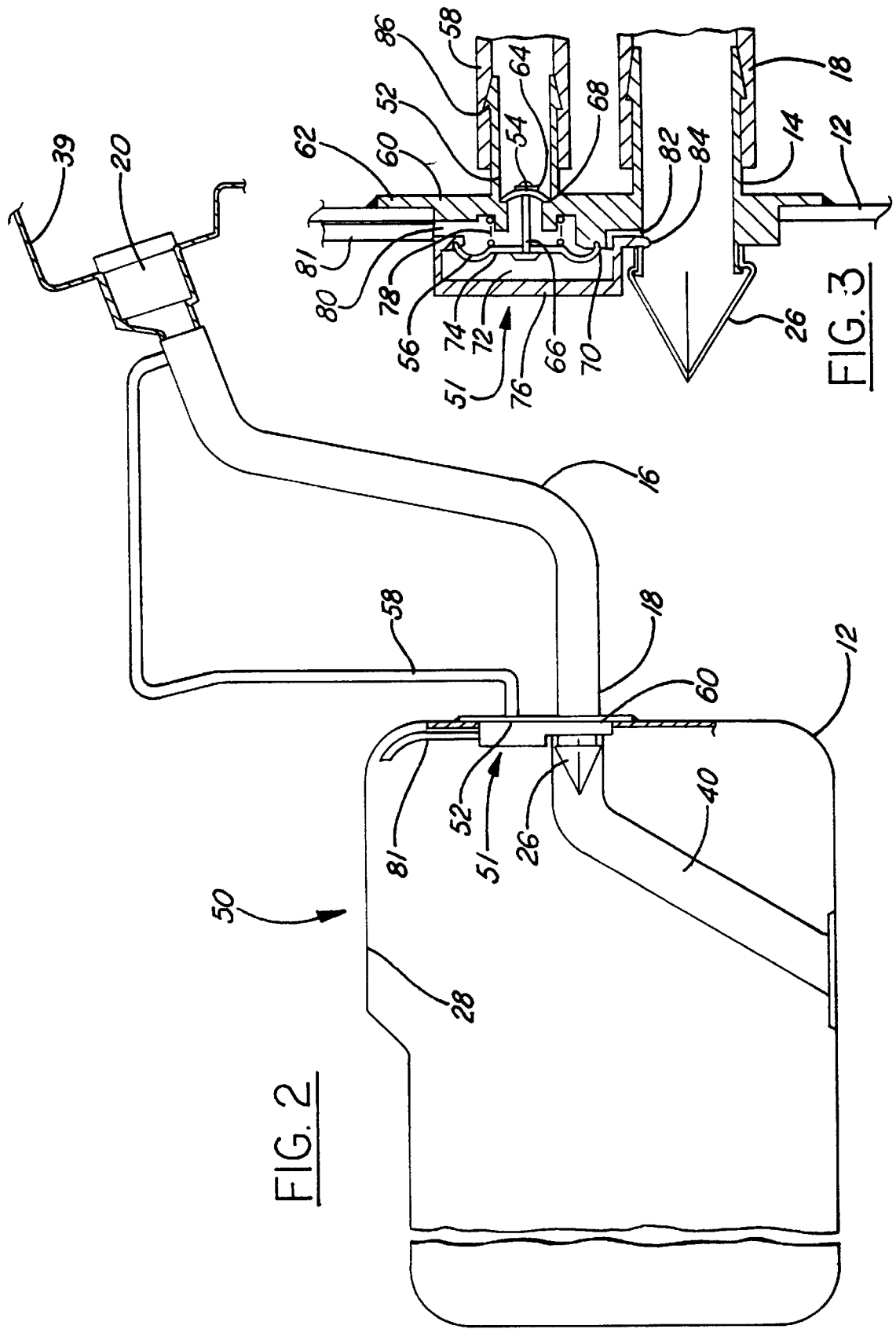

FUEL SYSTEM FOR REDUCING FUEL VAPOR

FIELD OF THE INVENTION

This invention relates to a fuel system for a vehicle and more particularly to controlling fuel vapors during fueling of a vehicle fuel tank.

BACKGROUND OF THE INVENTION

As concern for the environment increases, regulations for preventing the escape of volatile hydrocarbon vapors to the atmosphere are being promulgated by governmental agencies. One source of hydrocarbon vapors is the fuel tanks of vehicles using gasoline or other hydrocarbon fuels of high volatility. With current automotive fuel tank designs, fuel vapor can escape during the filling of the tanks and usually even after the tank is filled.

The use of an on-board vapor storage container to remove excess fuel vapor from the fuel tank is one solution to this problem. Some of these devices use a high capacity or high flow rate valve to control the flow of vapor from the fuel tank to a vapor storage canister. From the storage canister, the vapor is fed into the intake manifold of the engine to be consumed by the engine.

Current on-board vapor recovery systems send essentially all of the fuel vapor removed from the fuel tank to the vapor canister. This can produce a high flow rate of fuel vapor to the vapor canister requiring a large vapor canister which increases the cost of the vapor recovery system.

SUMMARY OF THE INVENTION

A system to collect and control the flow of hydrocarbon fuel vapor from a fuel tank. A vapor canister receives fuel vapors through a control unit mounted in the top of the fuel tank and communicates with the intake manifold of the vehicle engine for exhausting fuel vapor from the canister during operation of the engine. A fill pipe of the fuel tank also receives fuel vapors through the control unit such that when liquid fuel is being added through the fill pipe, a negative pressure is created adjacent the connection of the fill pipe and the control unit to draw vapor from the control unit to the fill pipe and thereby combine the vapor with the liquid fuel being added to the tank.

Typically, liquid fuel added to the fuel tank is drawn from underground storage containers and is lower in temperature than the vapor within the fuel tank. This difference in temperature helps to condense the fuel vapor when it is combined with the liquid fuel to thereby eliminate some of the vapor within the fuel system. This condensation of some of the fuel vapors within the system enables the use of a smaller vapor canister and thereby lowers the cost of the fuel system.

In another embodiment, a fuel system is provided with a diaphragm actuated valve associated with an inner vapor passage that is connected to the fill pipe. The diaphragm actuated valve allows fuel vapor to be drawn from the fuel tank through the inner vapor passage and into the fill pipe of the fuel tank when liquid fuel is being added to the fuel tank through the fill pipe. As in the first embodiment, this allows the vapor to be combined with the cooler liquid fuel to thereby condense at least some of the vapor in the liquid fuel.

Objects, features and advantages of this invention include providing a fuel system that recombines at least a portion of the fuel vapor within the fuel system with liquid fuel being added to the fuel tank of the system to thereby condense and eliminate at least a portion of the fuel vapor in the system, reduces the amount of fuel vapor in the system to thereby enable use of a smaller vapor canister associated with the system, prevents the escape of fuel vapor to the atmosphere, is rugged, durable, reliable, of relatively simple design, economical manufacture and assembly, and has a long useful life in service.

BRIEF DESCRIPTION OF THE DRAWINGS

These and other objects, features and advantages of this invention will be apparent from the following detailed description of the preferred embodiment and best mode, appended claims and accompanying drawings in which:

FIG. 2 is a diagrammatic view of a second embodiment fuel system having a diaphragm actuated valve;

FIG. 3 is an enlarged sectional view of the diaphragm actuated valve; and

DETAILED DESCRIPTION OF THE PREFERRED EMBODIMENT

Figure 1:
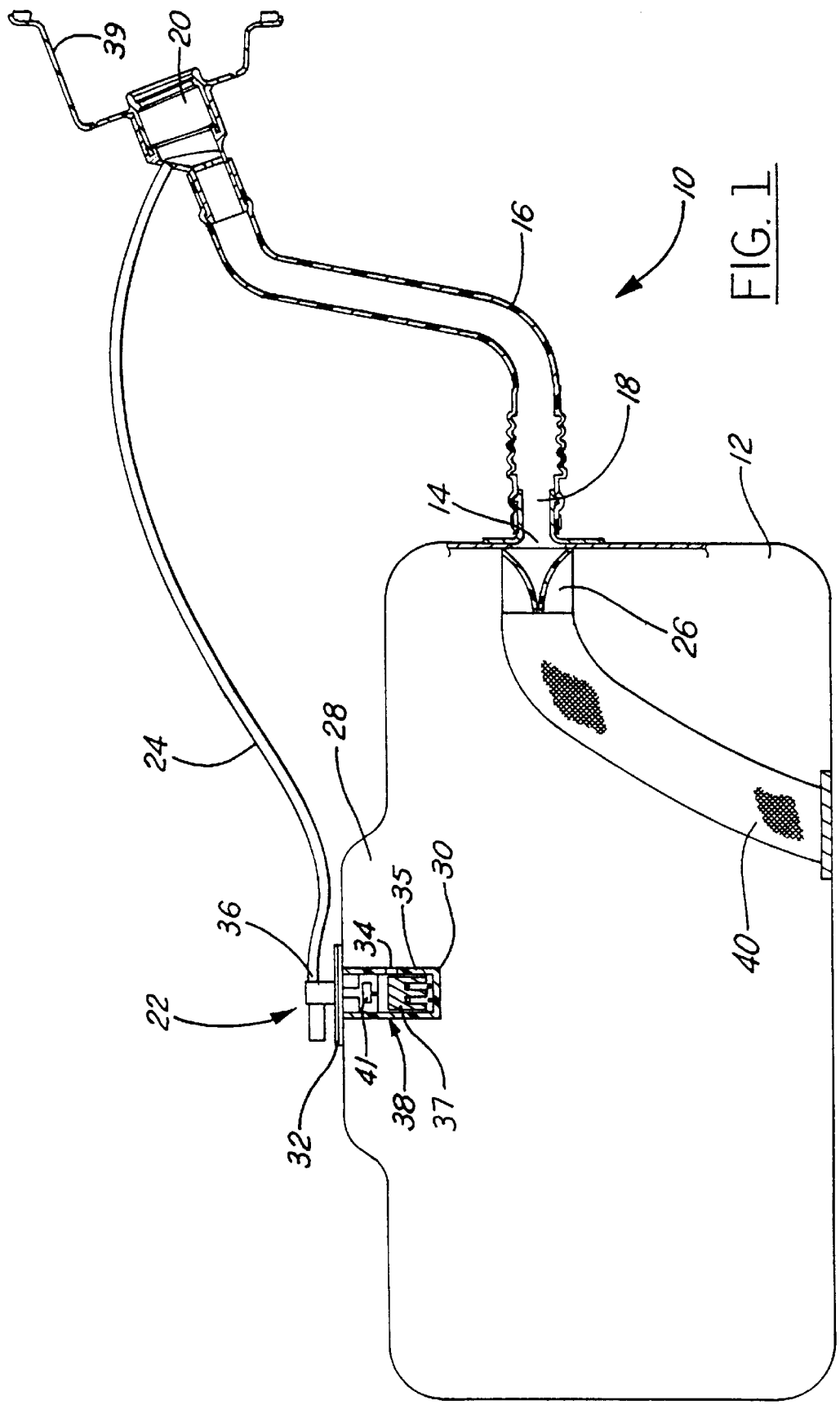
FIG. 1 is a diagrammatic view of a fuel system embodying this invention.

FIG. 1 diagrammatically illustrates a vehicle fuel system 10 embodying this invention. The system 10 has a fuel tank 12 with an inlet 14, a fill pipe 16 having an outlet 18 in communication with the inlet 14 of the fuel tank 12 and an inlet 20 open to receive a fuel nozzle, a vapor control unit 22 mounted in the top of the fuel tank 12, and a vapor conduit 24 communicating the control unit 22 with the inlet 20 of the fill pipe 16. Preferably, a check valve 26 is associated with the fuel tank inlet 14 to permit liquid fuel to flow into the tank 12 from the fill pipe 16 while preventing liquid fuel in the fuel tank 12 from reverse flowing into the fill pipe. The tank 12 is filled with liquid fuel through the fill pipe 16 and preferably, a raised area is provided in the top wall of the tank to provide a well defined vapor dome 28.

The vapor control unit 22 has a generally cylindrical housing 30 with a peripheral flange 32 which, in assembly, overlies and is sealed to the top of the fuel tank 12. To allow fuel vapor to flow into the control unit 22 from the fuel tank vapor dome 28, the control unit 22 has an opening 34 or an inner vapor passage in its side wall 35 located adjacent and below the top of the fuel tank 12. To allow the fuel vapor to flow from the control unit 22 to the inlet 20 of the fill pipe 16, the control unit 22 has an outlet 36 which communicates with the upper end of the fill pipe 16 adjacent its inlet 20 through the vapor conduit 24. The control unit 22 has a valve assembly 38 which controls the flow of fuel vapor from the fuel tank 12. Preferably, the valve assembly 38 has a float 37 buoyant in liquid fuel in the control unit 22 to close a vapor vent valve 41 to prevent liquid fuel from exiting the fuel tank 12 through the control unit 22. Also preferably, the valve assembly 38 is spring biased and constructed to prevent liquid fuel from escaping from the control unit 22 even during vehicle roll-over conditions. When the vapor vent valve of the control unit valve 41 assembly 38 is open fuel vapor within the fuel tank 12 can flow through the control unit 22, vapor conduit 24 and into the fill pipe 16 of the fuel system. A presently preferred control unit 22 and valve assembly 38 is disclosed in U.S. Pat. No. 5,579,802 the disclosure of which is incorporated herein by reference and hence, the control unit 22 will not be described in further detail.

The inlet 20 of the fill pipe 16 is preferably disposed vertically above the top of the tank 12 and received in an access pocket 39 of the vehicle. The inlet 20 of the fill pipe 16 is closed and sealed by a removable gas cap (not shown). To prevent reverse flow of fuel from the tank 12 through the fill pipe 16 a check valve 26 is located adjacent the outlet 18 of the fill pipe 16. The check valve 26 may be a ball, flapper, disc, duckbill or other type of suitable check valve permitting the free and rapid flow of fuel through the fill pipe 16 and into the tank 12 and preventing reverse flow of fuel in the tank 12 through the fill pipe 16.

Typically, to refill an at least partially empty fuel tank 12 with a liquid fuel, such as gasoline or diesel fuel oil, a dispensing nozzle with an automatic shut-off of a station fuel pump is inserted into the inlet 20 of the fill pipe 16. The dispensing nozzle valve is manually opened to discharge liquid fuel through the fill pipe 16, check valve 26, and into the tank 12, usually at a pressure of about 25 to 30 psi and a flow rate of 10 to 12 gallons per minute.

The fuel flowing into the tank 12 produces a superatomospheric pressure in the tank 12 which tends to force fuel vapor through the control unit 22, vapor conduit 24, and into the fill pipe 16. Additionally, the fuel flow through the fill pipe 16 produces a subatmospheric pressure adjacent the vapor conduit 24 which acts to draw vapor from the fuel tank 12 into the fill pipe 16 where the vapor is combined with the liquid fuel being added to the fuel tank 12. Typically, the liquid fuel being added to the tank 12 is drawn from an underground storage tank and is lower in temperature than the fuel vapor from the fuel tank 12. Adding this fuel vapor to the cooler liquid fuel tends to condense at least a portion of this fuel vapor thereby reducing at least a portion of the fuel vapor in the fuel system.

Preferably, a flow controlling member 40 is disposed adjacent the inlet 14 to the fuel tank 12 and the check valve 26. Preferably, the flow controlling member 40 is elongate and has a generally cylindrical side wall having openings therethrough small enough to control the flow of fuel into the fuel tank 12 and large enough to permit the essentially free flow of fuel from the fill pipe 16 into the fuel tank 12. The flow controlling member 40 is constructed to surround the inlet 14 to the fuel tank 12 at one end to control the discharge of fuel from the fill pipe 16 into the fuel tank 12 and thereby reduce the amount of fuel vapor produced during filling of the fuel tank 12. The flow controlling member 40 can be either opened or closed at its end opposite the fill pipe, and if open, is preferably attached to the fuel tank at that end. Alternatively, the flow controlling member 40 can comprise a plurality of elongate and generally individual strands of twine, horse hair or the like or, it may comprise an elongate tube with a pair of generally flat and opposed side walls. In any form, the flow controlling member 40 acts to reduce the turbulence and the splashing of the fuel as it is added to the fuel tank 12 to thereby reduce the amount of fuel vapor in the fuel system. Preferably the member 40 is made of an open mesh cloth of nylon having an average opening or pore size of about 30–70 microns and a maximum pore size of about 100 micron.

A second embodiment 50 of the fuel system according to this invention is shown in FIG. 2. This fuel system 50 has a fuel tank 12 with an inlet 14, a check valve 26, a controlling member 40, a fill pipe 16 having an outlet 18 communicating with the inlet 14 to the fuel tank 12 and having an inlet 20 at its opposite end open to receive a fuel nozzle. The system 50 has a valve assembly 51 with an outlet vapor passage 52 constructed to communicate with the interior of the tank 12 generally adjacent the top of the tank 12, a valve 54 associated with the vapor passage 52 and actuated by a diaphragm to open and close the passage 52 and a vapor conduit 58 communicating the outlet vapor passage 52 with the fill pipe 16 adjacent its inlet 20. The fuel tank 12, fill pipe 16, check valve 26 and the controlling member 40 have essentially the same construction and function as in the first embodiment and hence will not be described again.

As shown in FIG. 3, the valve 54, diaphragm 56 and check valve 26 are carried by a housing 60 mounted and sealed adjacent a side wall of the tank 12 and preferably, generally adjacent the top of the tank 12, with an overlying flange 62. The outlet vapor passage 52 and the fuel tank inlet 14 are preferably annular passages formed in the housing 60 and extending exteriorly of the fuel tank 12. The valve 54 preferably has an annular valve head 64 and a valve stem 66 located within the outlet vapor passage 52. The valve head 64 is constructed to engage an annular valve seat 68 formed in the outlet vapor passage 52 to prevent flow through the vapor passage 52 when the valve 54 is closed. Preferably, the diaphragm 56 is generally annular, is retained and sealed about its periphery in a shoulder 70 of the housing 60 and defines a vapor chamber 72 between its outer face 74 and a cap 76 attached to the housing 60. The diaphragm 56 is operably connected with the valve 54 by the valve stem 66 attached at one end to the diaphragm 56 and at its other end to the valve head 64. A coil spring 78 is received between the housing 60 and the diaphragm 56 and yieldably biases the diaphragm 56 to close the valve 54 on the valve seat 68.

The housing 60 has an inner vapor passage 80 communicating through a tube 81 with the vapor dome 28 adjacent the top of the fuel tank 12 and, when the valve 54 is open, with the outlet vapor passage 52. A vapor conduit 58 communicates the outlet vapor passage 52 with the fill pipe 16 adjacent its inlet 20. The housing 60 also has a control passage 82 communicating the chamber 72 defined by the diaphragm 56 and housing 60 with the fuel inlet 14. Preferably, a flow diverter 84 is provided on the housing 60 adjacent to and downstream of the opening of the control passage 82 into the fuel inlet 14. Also preferably, the outer vapor passage 52 is formed with an annular rib or flange 86 on its exterior constructed to retain a flexible vapor conduit press-fit over the outer vapor passage 52 as shown in FIG. 3.

When refueling an at least partially empty fuel tank 12 with a dispensing nozzle of a fuel station fuel pump the flow of fuel through the fill pipe 16 and into the tank 12, past the control passage 82 and around the diverter 84 creates a super-atmospheric pressure in the control passage 82 and the chamber 72 which actuates the diaphragm 56 to move the valve 54 away from its valve seat 68 and open the valve 54. The flow of fuel through the fill pipe 16 past the vapor conduit 58 also creates a sub-atmospheric pressure in the vapor conduit 58 which tends to act on the valve 54 to open it and when open also acts on the diaphragm 56 to urge the valve 54 toward the open position. While the valve 54 is open, fuel vapor from the tank flows through the inlet tube 81, inlet 80, outlet 52, conduit 58 and into the upper end of the fill pipe 16 where the vapor is entrained in the liquid fuel being added to the fuel tank which results in at least a portion of this vapor condensing to liquid fuel to thereby reduce the amount of fuel vapor in the fuel system.

Figure 4:
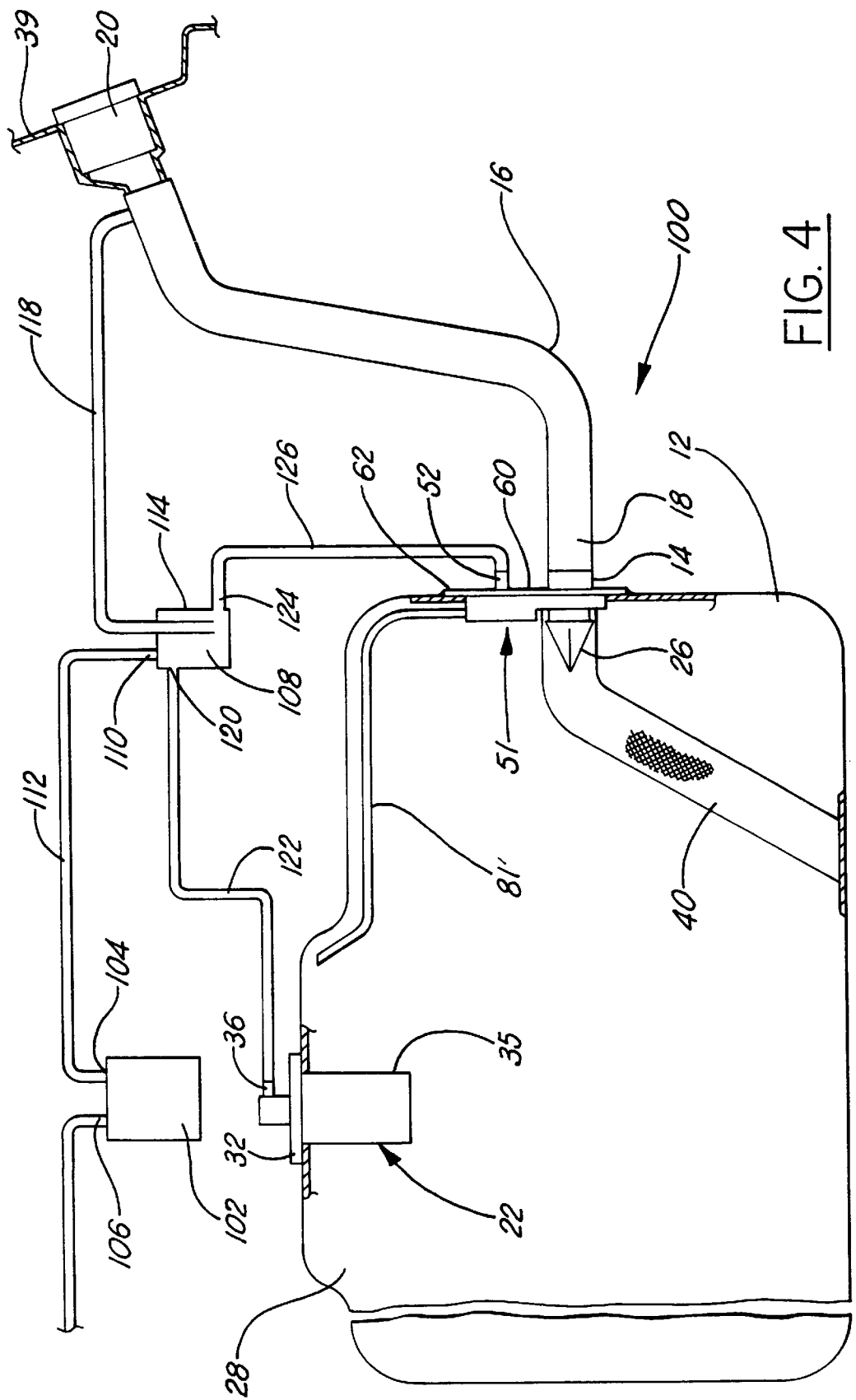
FIG. 4 is a diagrammatic view of a third embodiment of this invention.

FIG. 4 illustrates a third fuel system 100 embodying this invention in which components which are the same as those of the other embodiments have the same reference numbers. This system 100 has a vapor canister 102 with an inlet 104 to receive fuel vapor and an outlet 106 connected to an air intake manifold of an internal combustion engine to vent vapor into the engine for combustion during its operation, and a liquid vapor separator 108 communicating with the outlet vapor passage 52, the control unit 22, the vapor canister 102, and the inlet 20 to the fill pipe 16. The fuel tank 12, fill pipe 16, control unit 22, check valve 26, controlling member 40 and valve assembly 51 have essentially the same construction, function and operation as described earlier and, to that extent, will not be described again.

Typically, the vapor canister 102 is filled with activated charcoal (preferably grade 15) to absorb the hydrocarbon vapors received through the inlet of the canister 102. The canister 102 also discharges the absorbed vapors from the canister 102 and into the intake manifold of the vehicle engine when operating.

The liquid-vapor separator 108 has a first outlet 110 communicating with the inlet 104 of the vapor canister 102 through a suitable flexible hose 112. The liquid-vapor separator 108 has a second outlet 114 communicating with the fill pipe 16 adjacent its inlet 20 by a flexible hose 118. Preferably the lower end of the outlet 114 is disposed adjacent the bottom of the liquid-vapor separator 108. The separator 108 also has a first inlet 120 to receive fuel vapor from the control unit 22 through a suitable flexible hose 122. To receive fuel vapors from the outlet vapor passage 52 the separator has a second inlet 124 communicating with the outlet vapor passage 52 through another flexible hose 126.

In operation, when liquid fuel is being added to the fuel tank 12, a superatomospheric pressure is created in the fuel tank 12 forcing vapor into the control unit 22 and to the liquid-vapor separator 108 through the conduit 122 between them. From the separator 108 at least a portion of the fuel vapor flows through the first outlet 110 of the separator 108 to the inlet 104 of the vapor canister 102 where that portion of the vapor is either absorbed by the charcoal in the canister 102 or vented to the engine to be consumed by the engine during its operation.

Generally simultaneously, the valve 54 in the outlet vapor passage 52 is opened as described in the second embodiment allowing fuel vapor to flow from the fuel tank 12 through the outer vapor passage 52 to the liquid-vapor separator 108. Also generally simultaneously, the flow of liquid fuel through the inlet 20 of the fill pipe 16 creates a pressure drop adjacent the vapor conduit 118 connecting the liquid-vapor separator 108 to the inlet 20 of the fill pipe 16. This pressure drop in the vapor conduit 118 tending to draw the contents adjacent the bottom of the liquid-vapor separator 108 through the conduit 118 and into the inlet 20 of the fill pipe 16 to be combined with the liquid fuel being added to the system. Thus, at least a portion of the vapor within the liquid-vapor separator 108 is drawn through the conduit 118 connected to the fill pipe 16 to be combined with the fuel being added to the fuel tank 12. This tends to condense at least a portion of the vapor thereby reducing the total amount of vapor in the fuel system.

In operation, each of the embodiments 10, 50, 100 of this invention reduces the total amount of fuel vapor within the fuel system. Further, when a vapor canister 22 is used with the fuel system, a smaller vapor canister 22 can be used due to the reduced amount of fuel vapor in the system. Thus, the total cost of the fuel system is reduced while effectively controlling the fuel vapor within the system and preventing the emission of hazardous fuel vapors into the environment.

We claim:

1. A fuel system comprising:

a fuel tank;

an inlet to the fuel tank;

a fill pipe communicating at one end with the inlet of the fuel tank and having a fill pipe inlet adjacent the other end and spaced vertically above the top of the fuel tank;

a normally open vapor control valve communicating with the fuel tank adjacent the top of the fuel tank and constructed and arranged to close when the level of liquid fuel in the tank is immediately adjacent the top of the tank; and a vapor conduit communicating the vapor control valve with the fill pipe adjacent to and downstream of its inlet whereby vapor within the fuel tank is forced through the control valve and vapor conduit and directly into the fill pipe when fuel is being added to the tank through the fill pipe to entrain the fuel vapor in the fuel flowing through the fill pipe and condense at least some of the fuel vapor.

2. The system of claim 1 which also comprises a check valve associated with the fill pipe adjacent the fuel tank to permit liquid flow into the fuel tank from the fill pipe and to prevent liquid flow out of the fuel tank through the fill pipe.

3. The system of claim 1 wherein the vapor conduit is smaller in size than the fill pipe so that when liquid fuel is being added through the fill pipe there is a sufficient pressure drop adjacent the vapor conduit to draw vapor through the vapor conduit and into the fill pipe to be combined with the liquid fuel being added to the tank.

4. The system of claim 1 which also comprises a flow controlling member disposed adjacent the inlet of the fuel tank to control the discharge of fuel into the tank to reduce the quantity of fuel vapors produced during filling of the fuel tank.

5. A fuel system comprising:

a fuel tank;

an inlet to the fuel tank;

a fill pipe communicating at one end with the inlet of the fuel tank and having a fuel inlet adjacent the other end and spaced vertically above the top of the fuel tank;

an outlet vapor passage communicating with the interior of the fuel tank adjacent the top of the fuel tank;

a vapor conduit communicating the outlet vapor passage with the fill pipe adjacent to and downstream of its inlet;

a valve associated with the outlet vapor passage to open and close the passage;

a diaphragm operably associated with the valve;

a chamber defined at least in part by the diaphragm; and a control passage communicating the chamber with the inlet of the fuel tank whereby a pressure is produced in the chamber when liquid fuel is being added to the fuel tank and said pressure displaces the diaphragm to move the valve and open the outlet vapor passage allowing vapor to be forced from the tank through the outlet vapor passage, vapor conduit and directly into the liquid fuel being added to the fuel tank to entrain and condense at least some of the fuel vapor.

6. The fuel system of claim 5 which also comprises a flow diverter disposed adjacent to the control passage and the fuel inlet of the fuel tank and constructed to direct the flow of liquid fuel adjacent the control passage to create a positive pressure in the control passage.

7. The fuel system of claim 5 wherein the outlet vapor passage, inlet to the fuel tank, valve and diaphragm are carried by a housing constructed to be mounted and sealed to the fuel tank with an overlying flange.

8. The fuel system of claim 7 wherein the chamber is defined by the housing and the diaphragm.

9. A fuel system comprising:

a fuel tank;

an inlet to the fuel tank;

a fill pipe communicating at one end with the inlet of the fuel tank and having a fuel inlet adjacent the other end and spaced vertically above the top of the fuel tank;

an outlet vapor passage communicating with the interior of the fuel tank adjacent the top of the fuel tank;

a valve associated with the outlet vapor passage to open and close the passage;

a diaphragm operably associated with the valve;

a chamber defined at least in part by the diaphragm;

a control passage communicating the chamber with the inlet of the fuel tank;

a vapor control unit having an outlet exterior of the fuel tank;

a vapor canister having an inlet to receive fuel vapors and an outlet in communication with a manifold of an engine, and a liquid-vapor separator having a first inlet in communication with the outlet of the vapor control unit, a second inlet in communication with the outlet vapor passage, a first outlet in communication with the inlet of the vapor canister and a second outlet in communication with the fill pipe adjacent to and downstream of its inlet whereby during filling of the fuel tank fuel vapors are forced into the liquid-vapor separator through at least one of the outer vapor passage and the vapor control unit whereupon the vapor flows to the vapor canister and the fill pipe to be entrained in liquid fuel being added to the fuel tank to condense at least some of the fuel vapor.

10. The fuel system of claim 9 which also comprises a flow diverter disposed adjacent to the control passage and the fuel inlet of the fuel tank and constructed to direct the flow of liquid fuel adjacent the control passage to create a positive pressure in the control passage.

11. The fuel system of claim 9 wherein the chamber is defined by the housing and the diaphragm.

12. The fuel system of claim 9 wherein the first outlet of the liquid-vapor separator is located vertically above the second inlet and the second outlet to prevent any liquid in the separator from being drawn into the vapor canister.

13. The fuel system of claim 9 wherein the second outlet of the liquid-vapor separator is disposed generally adjacent the bottom of the separator so that any liquid within the separator is drawn into the fill pipe.

* * * * *